Jan. 9, 1968  K. C. BUMGARDNER  3,362,144
HARVESTER

Filed Dec. 23, 1964  4 Sheets-Sheet 1

INVENTOR.
KENNETH C. BUMGARDNER
BY
*Joseph A. Brown*
ATTORNEY

Jan. 9, 1968    K. C. BUMGARDNER    3,362,144
HARVESTER
Filed Dec. 23, 1964    4 Sheets-Sheet 2

INVENTOR.
KENNETH C. BUMGARDNER
BY
*Joseph A. Brown*
ATTORNEY

Jan. 9, 1968  K. C. BUMGARDNER  3,362,144
HARVESTER
Filed Dec. 23, 1964  4 Sheets-Sheet 3
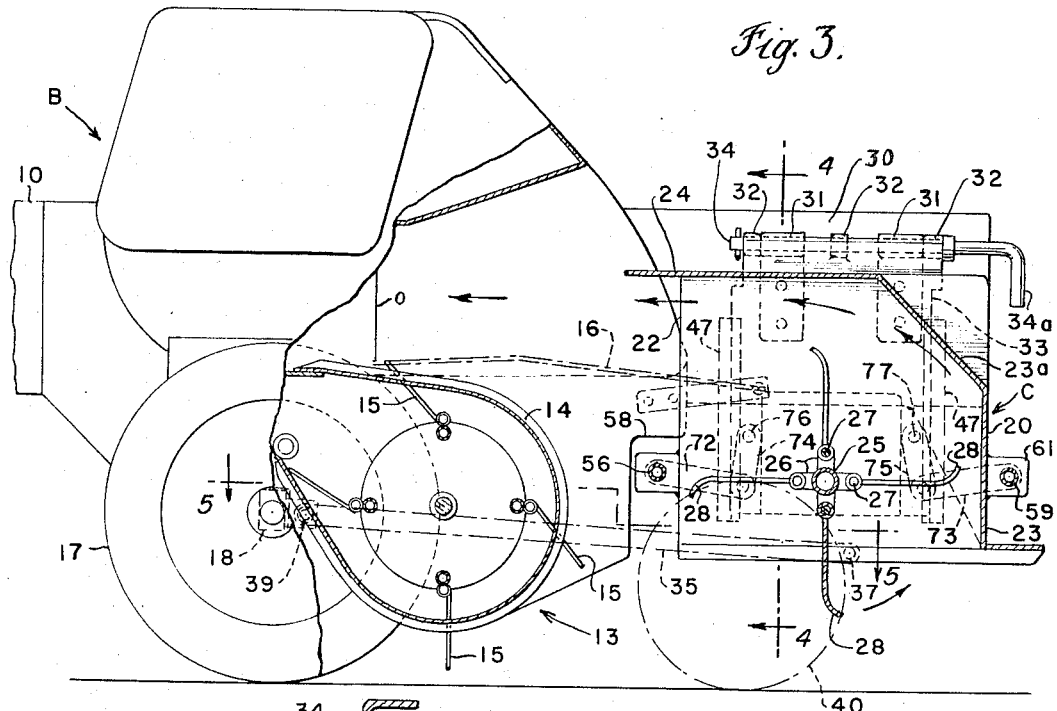
Fig. 3.
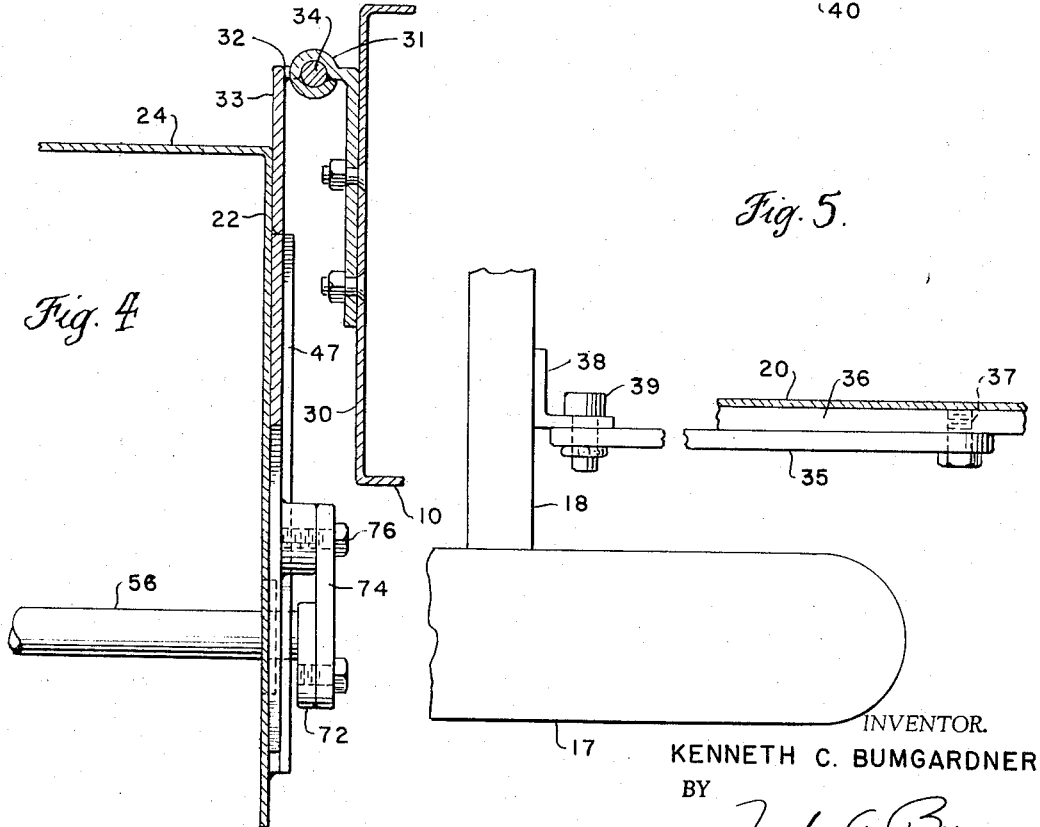
Fig. 4.
Fig. 5.
INVENTOR.
KENNETH C. BUMGARDNER
BY
Joseph A. Brown
ATTORNEY Jan. 9, 1968            K. C. BUMGARDNER            3,362,144

HARVESTER

Filed Dec. 23, 1964                                                           4 Sheets-Sheet 4

INVENTOR.
KENNETH C. BUMGARDNER
BY
Joseph A. Brown
ATTORNEY

United States Patent Office 3,362,144
Patented Jan. 9, 1968

3,362,144
HARVESTER
Kenneth C. Bumgardner, Waverly, Iowa, assignor to Sperry Rand Corporation, New Holland, Pa., a corporation of Delaware
Filed Dec. 23, 1964, Ser. No. 420,734
13 Claims. (Cl. 56—24)

ABSTRACT OF THE DISCLOSURE

An agricultural machine having a rotary flail-type cutter for severing standing crop material and discharging it to a rotatable pickup, and a baling mechanism for forming the severed crop material into bales.

---

This invention relates generally to farm equipment. More specifically, the invention relates to a harvester unit for cutting and baling corn stalks and other crop material.

After corn is harvested, a stubble remains which has little food value but which is very absorbent and makes excellent bedding for farm animals. Therefore, many farmers harvest the stubble. This is usually done by cutting the stubble close to the ground, then raking it into windrows, and finally baling the material with a conventional baler.

The harvesting of corn stalks by this three-operation process involves some disadvantages. In addition to being time consuming, it is difficult to rake the cut material in a rough corn field. Also, the repeated handling results in bales which contain a considerable amount of dirt and other residue.

To eliminate the three step procedure for harvesting and baling corn stalks, it has been known heretofore to reconstruct a baler by substituting a flail chopper unit for the baler pick-up. This is generally unsatisfactory because the baler is then no longer usable as a conventional baler. It has also been practiced to remove the pick-up from a baler and then to add a chopper unit so designed that it fits the space normally occupied by the pick-up. The baler can be changed over from the chopper to the pick-up and vice versa. This involves problems because of the great amount of time required to remove a pick-up and mount a chopper in its place. Further, with both approaches any dust or foreign material which is picked up by the chopper is fed directly into the baler, and no means is provided to align or orient the stalks as they come from the chopper knives.

Another method of harvesting corn stalks is to hook a baler behind a chopper carried on its own wheeled frame and then pull the two units in tandem behind a tractor. This type of arrangement is generally unsatisfactory. The chopper has a long, rearwardly extending spout which directs air borne material toward the baler pick-up. The chopper is spaced substantially forwardly of the baler and the spout is widely spaced from the baler pick-up. Because of the distance of trajecting the material, much of it is lost, particularly on windy days. Further, it is difficult to maneuver with the two implements hitched one behind the other.

One object of this invention is to provide a harvester comprising a conventional baler and a chopper detachably mountable thereon, the structure employed being such that the basic baler remains substantially the same regardless of whether the chopper is attached or detached.

Another object is to provide a harvester of the character described wherein the chopper may be mounted and/or detached quickly and easily.

Another object of this invention is to provide a harvester unit of the character described which utilizes the baler pick-up to slow down, align and orient stalk material as it comes from a chopper located directly in front of the pick-up and alongside the baler bale case.

A further object of this invention is to provide harvester of the character described wherein the chopper is mounted to float relative to the baler on which it is mounted and independently of a pick-up behind the chopper.

A still further object of this invention is to provide a low cost chopper attachment mountable directly on a baler and so related to the basic baler that a more efficient and effective harvesting of corn stalks is achieved than available heretofore.

Other objects of this invention will be apparent hereinafter from the specification and from the recital in the appended claims.

In the drawings:

FIG. 3 is a part sectional, part elevational view taken generally on the line 3—3 of FIG. 1 with the drive mechanism omitted, and with certain parts located in front of the plane of the section appearing in dot and dash lines;

FIG. 4 is an enlarged fragmentary section taken on the line 4—4 of FIG. 3 illustrating the pivotal connection of the chopper unit to the bale case of the baler;

FIG. 5 is an enlarged fragmentary, broken section taken on the line 5—5 of FIG. 3 illustrating the stabilizer bar connection of the chopper unit to the baler axle.

Figure 1:
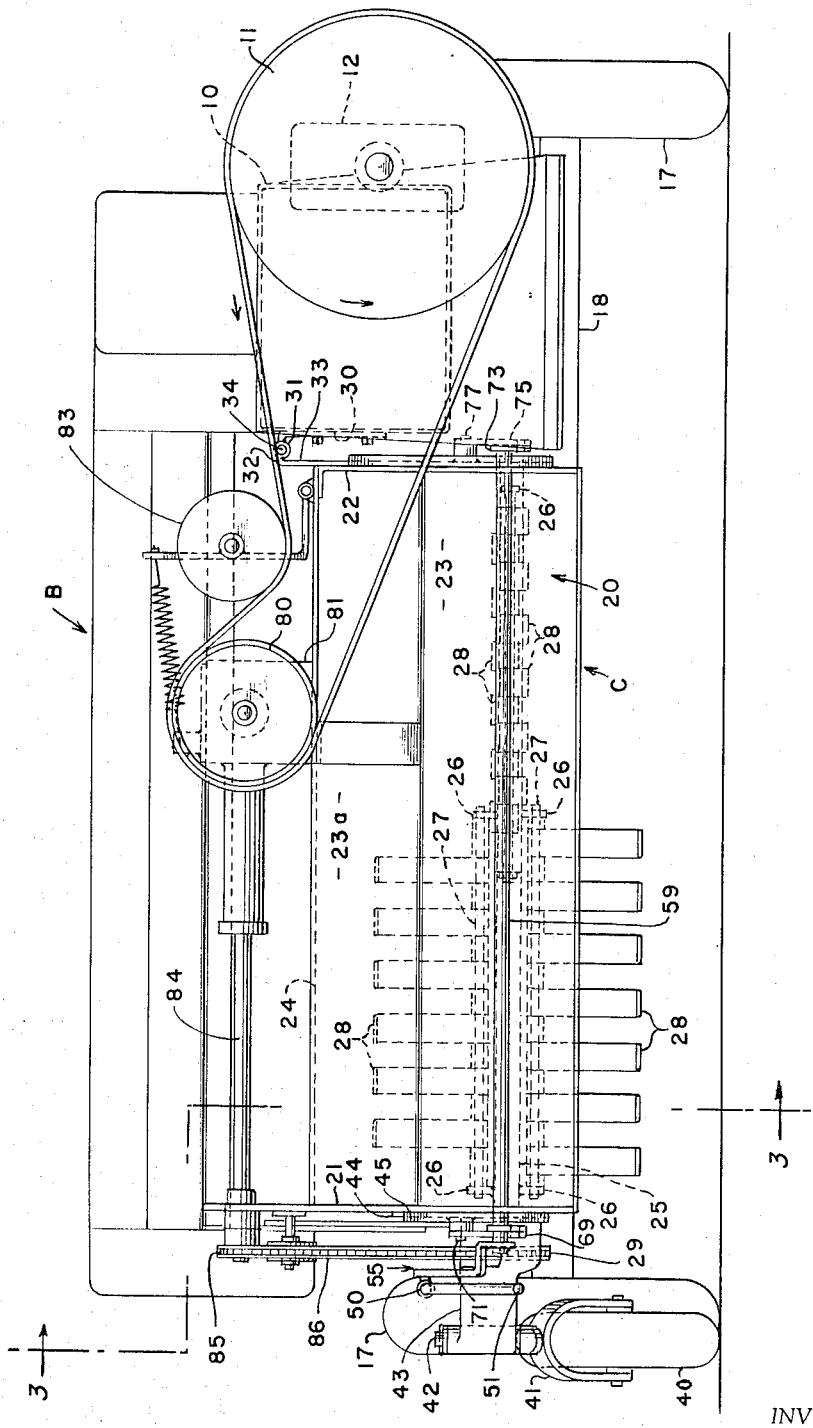
FIG. 1 is a front elevational view of the harvester device showing the chopper unit and the baler.

Referring now to the drawings by numerals of reference letter B denotes the baler unit and reference letter C denotes the chopper unit. The baler B is of conventional construction and comprises in general a bale case 10 having a reciprocating plunger, not shown, driven from the flywheel 11 and gear unit 12, a rotary pick-up unit 13 having guards 14 and tines 15, and supporting wheels 17 mounted on axle 18.

The chopper unit C comprises in general a housing 20 having a front wall 23 and a top wall 24, a frame having side walls 21 and 22 and a chopper rotor 25. Chopper knives 28 are pivotally mounted in spaced relation on bars 27. Each bar 27 is rigidly attached to the rotor 25 by lugs 26. A drive sprocket 29 secured on one end of the rotor 25 is driven by power derived from the baler flywheel 11. As the rotor shaft is driven, the radially extending chopper knives sweep forwardly, upwardly and then rearwardly, whereby standing crop material is cut, then elevated and discharged rearwardly to the baler pick-up.

The harvester of this invention is provided with a novel two-point attachment means so that the chopper can be readily detached from the baler unit and the resulting structure may be used as a conventional baler. At one of the attachment points, an interfitting hinge connection secures the chopper to side wall 30 of the bale case and is denoted generally by reference numeral 19 shown in FIG. 2. The other attachment means, also shown in FIG. 2, consists of a stabilizer bar 35 which is attached to axle 18 of the baler by means of a bracket 38 and a pin 39. It will thus be seen that when the chopper is removed by disengaging the connections at the two points of attachment, the resulting machine is ready for a baling operation. A wind guard 16, shown in dotted lines in FIG. 3, may be added to the baler when the chopper is removed, if desired.

The interfitting hinge connection detachably and pivotally secures the chopper to side wall 30 of the bale case 10. The hinge comprises butts 31 secured to the wall 30, butts 32 provided on a slider plate 33 mounted on the side wall 22 of the chopper frame, and a hinge pin 34. It will be noted that the butts 31 and 32 are so constructed that side wall 22 of the chopper frame is in spaced relation to the side wall 30 of the bale case, thereby enabling pivotal movement of the chopper with respect to the baler. Further, it is noted that the hinge pin 34 is provided with a handle end 34a by means of which it can be inserted and removed conveniently, thus enabling quick, easy attachment and detachment of the chopper to the baler case.

The connection means at the second attachment point extends from the opposite side wall 21 located at the chopper and remote from the bale case and comprises a stabilizer bar 35 (see FIGS. 2, 3 and 5) which is connected at one end to a cross member 36 on the side wall 21 by bolt 37; at its other end the stabilizer bar is connected to bracket 38 by pin 39. The stabilizer bar 35 can be attached to or detached from the baler by the simple insertion or removal of pin 39.

Figure 2:
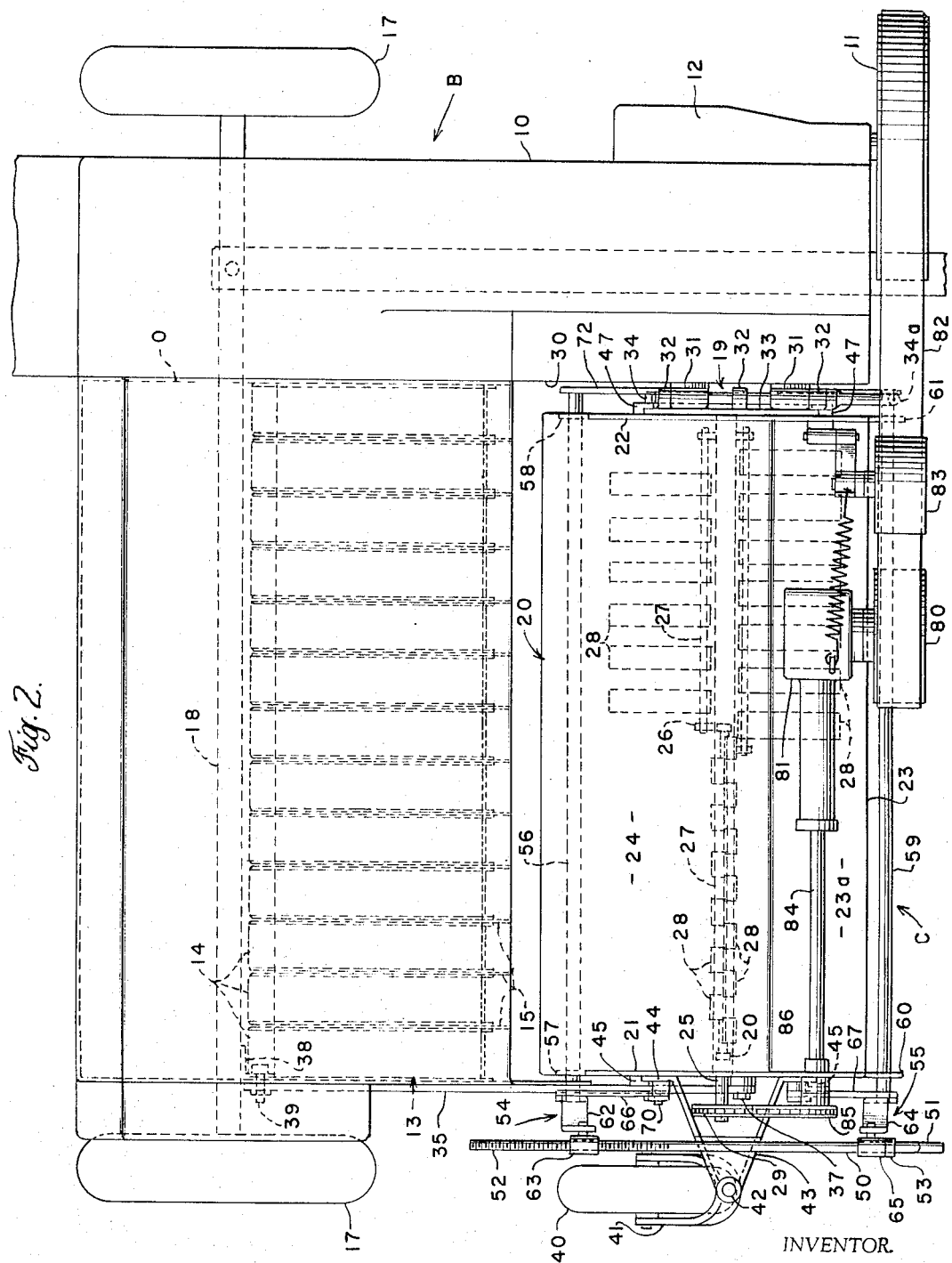
FIG. 2 is a plan view of FIG. 1.
Figure 6:
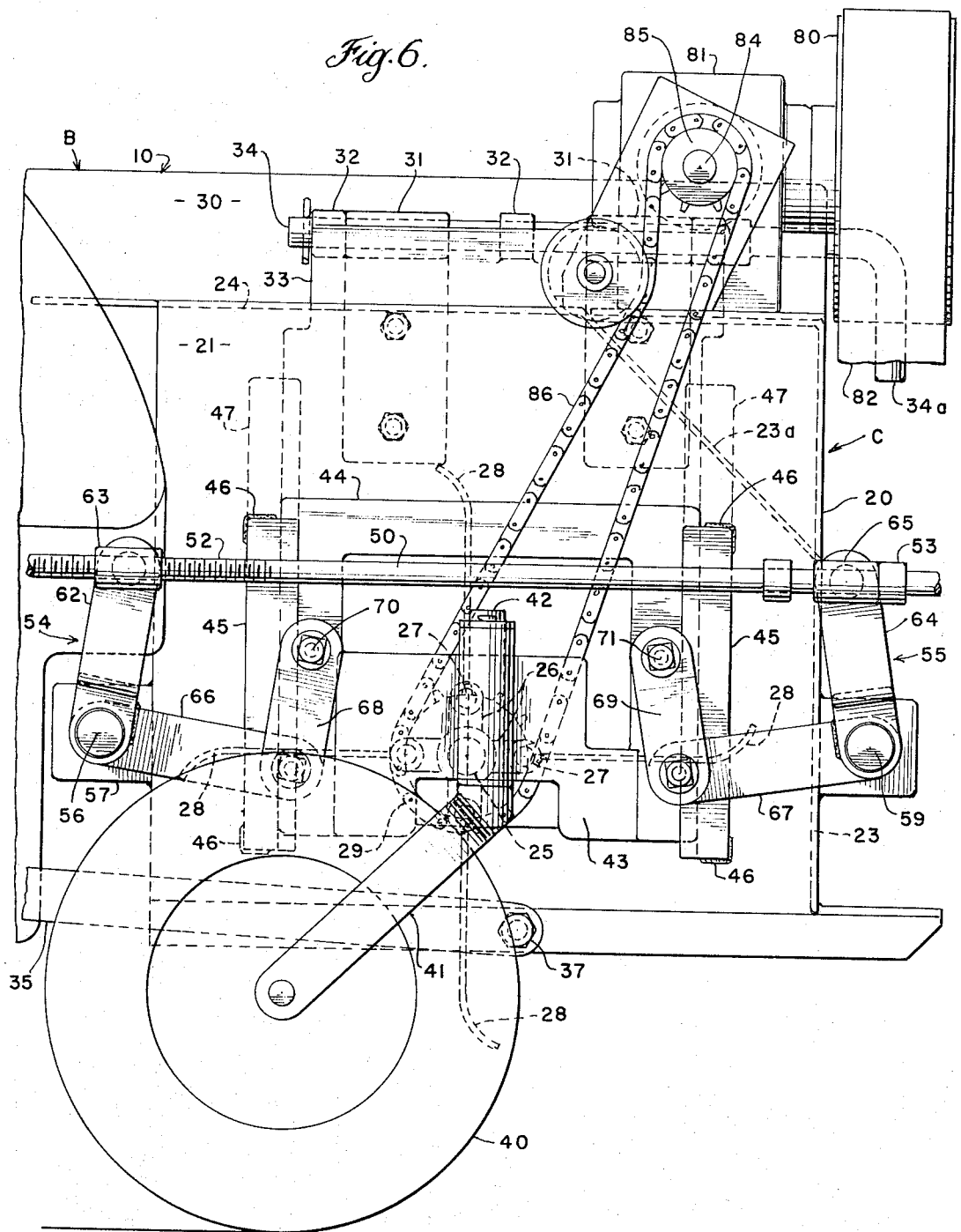
FIG. 6 is an enlarged side elevational view of the chopper unit with its drive and knife adjusting mechanism.

In addition to the two-point attachment means discussed above, the chopper is supported by a caster wheel 40 which is mounted on a swivel yoke 41 having a swivel pin 42 which is pivotally mounted to a bracket 43 (see FIGS. 2 and 6). Bracket 43 has a plate-like slider member 44 which moves in vertical tracks 45 secured to the side wall 21 of the chopper frame by means of welds 46 or other like means.

The height which the chopper knives operate relative to the ground is regulated by a vertical adjustment means which comprises a pair of adjustment devices, one at each end of the rotor. The adjustment devices are interconnected by a pair of rock bars so that when one end of the rotor is adjusted, the opposite end is correspondingly adjusted. Adjustment is accomplished by moving the chopper frame up and down on one end with respect to the caster wheel and on the other end with respect to the interfitting hinge connection.

One adjustment device is located adjacent the caster wheel and comprises a screw rod 50 which is provided with a handle portion 51, a threaded portion 52 and a thrust collar 53. The screw rod is adapted to operate a pair of bell cranks 54 and 55. Bell crank 54 is secured on a rock shaft 56 extending across the width of housing 20 and mounted in a tab 57 on the left side wall 21. Similarly, bell crank 55 is secured on rock shaft 59 mounted in tab 60. The upper arm 62 of bell crank 54 is provided with a swivel nut 63 which threadedly receives the operating rod 50. The upper arm 64 of bell crank 55 is provided with a swivel collar 65 which receives operating rod 50 and against which the thrust collar 53 on rod 50 bears. The lower arms 66 and 67 of bell cranks 54 and 55 respectively, are connected by means of links 68 and 69 and pins 70 and 71 to slider portion 44 of the caster wheel bracket 43. Hence, it will be seen that as the operator turns rod 50 in a clockwise direction bell crank 54 will turn in a clockwise direction and bell crank 55 will turn in a counterclockwise direction; this will result in moving the chopper upwardly on slider portion 44 of the bracket 43.

The other adjustment device is located adjacent the bale case and is linked to the adjustment device described above by rock shafts 56 and 59. At the bale case end, rock shaft 59 pivots in tab 61 on side wall 22 of the frame and rock shaft 56 pivots in tab 58 on the opposite side of wall 22. Lever 72 is secured to rock shaft 56 and lever 73 is secured to rock shaft 59. Links 74 and 75 are pivotally secured to levers 72 and 73 respectively, and the links are in turn secured to slider plate 33 by means of pins 76 and 77. Slider plate 33 moves in vertical tracks 47 on the chopper frame. Therefore, it will be seen that as levers 72 and 73 are pivoted by rock shafts 56 and 59, this end of the chopper will be raised and lowered to the same extent that the opposite end is raised and lowered by the bell cranks.

Drive means is provided to the chopper rotor through various drive elements powered by the baler flywheel 11. With reference to FIG. 1, it will be seen that baler flywheel 11, which rotates about a fore-and-aft axis, is drivingly connected to drive pulley 80 of a gear unit 81 by belt 82. A spring loaded belt tightener pulley 83 engages the top rim of the belt and acts in the nature of a friction or slip drive for the chopper unit. The output shaft 84 of the gear unit carries a sprocket 85 which is drivingly connected to the rotor sprocket 29 by chain 86. The chopper knives 28 are preferably arranged on the shaft so that the left half of the shaft carries diametrically opposed knives and the right half of the shaft carries diametrically opposed knives, the plane of the knives on the right half being substantially perpendicular to the plane on the knives on the left half when the chopper knives are radially extended.

With reference to FIG. 3, it will be noted that the upper portion 23a of the front wall 23 of the housing 20 is slanted so as to give a good sweep to the crop in passing from the chopper knives to the pick-up chamber of the baler, as indicated by the direction arrows.

In operation, the harvester unit of this invention is drawn through the field by a tractor. The tractor power take-off serves to drive the baler flywheel which in turn drives both the chopper and the bale forming mechanism. The chopper knives sever the corn stalks and fling them upward and backward to the baler pick-up. The baler pick-up slows the stalks down, aligns them and delivers them to the baler chamber in an orderly manner. From the chamber, the stalks are fed into the bale case where they are compressed and formed into bales. It will be noted, with reference to FIG. 3, that two outlets are provided for the discharge of foreign material picked up by the chopper knives. Dust-laden air will escape in the space between the rearward end of the top wall 24 and the front portion of the feed chamber. Heavier objects, e.g., small rocks and clods, will fall between the chopper and pick-up and will be discharged downwardly. Any small lengths of crop material which may also sift downwardly are picked up by the baler pick-up so that the loss of crop material is minimized.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention what I claim is:

1. A harvester for cutting and baling corn stalks and other crop material comprising in combination a hay baler having a wheel supported frame adapted to travel in a forward direction, a bale case extending generally horizontally in a fore-and-aft direction on one side of said frame, said bale case having a vertical side wall provided with an infeed opening, a feed chamber extending laterally from a medial portion of said bale case and having one end communicating with said infeed opening and an inlet opened forwardly to receive crop material delivered rearwardly, a pick-up rotatable on a transverse axis in front of said chamber, said pick-up having a crop engaging means which elevates crop material and directs it rearwardly through said chamber inlet, power means for operating said baler, a chopper positioned directly in front of said pick-up and along said side wall of the bale case, a portion at least of said chopper being in lateral register with said side wall, said chopper having a pair of laterally spaced frame side walls, a rotor journalled in said side walls and extending generally parallel to said pick-up, said rotor comprising a plurality of radially extending knives which are adapted to collect crop material from the field and sweep the material upwardly and rearwardly into said pick-up and said chamber, a housing over said rotor and including a top wall above the rotor for guiding the travel of crop material rearwardly, detachable means connecting one of said frame side walls to said baler to support the chopper on the baler, and drive means connecting said baler power means to the rotor of said chopper.

2. A harvester as recited in claim 1 wherein said chopper is supported on at least one ground wheel.

3. A harvester as recited in claim 2 wherein said ground wheel is castered and located toward an end of the chopper remote from said bale case.

4. A harvester, as recited in claim 3, wherein said detachable means comprises interfitting hinge elements, one of said hinge elements is fixed to said bale case side wall, another of said hinge elements is carried on said one frame side wall of the chopper, and said hinge elements are linked by a pin which extends in a fore-and-aft direction relative to ground travel.

5. A harvester as recited in claim 4 wherein a fore-and-aft extending stabilizer bar is provided between said remote end of the chopper and a portion of said baler frame rearwardly thereof, and said bar is detachably connected to said baler frame.

6. A harvester as recited in claim 1 wherein means is provided for vertical adjustment of said chopper and the rotor carried thereby whereby the location of said chopper knives relative to the ground may be varied.

7. A harvester as recited in claim 6 wherein said vertical adjustment means comprises a pair of adjustment devices, one at each end of the rotor and, said devices are interconnected whereby when one end of the rotor is adjusted the opposite end is correspondingly adjusted.

8. A harvester as recited in claim 1 wherein said power means comprises a flywheel on said bale case, and wherein said drive means comprises an endless member extending around said flywheel.

9. A harvester as recited in claim 8 wherein means is provided to allow said endless member to slip responsive to an overload condition.

10. A harvester as recited in claim 8 wherein said flywheel rotates about a fore-and-aft axis, said endless member is a drive belt extending around said flywheel and around a pulley on said chopper, and the drive from said pulley to said rotor includes a right angle gear box.

11. A harvester for cutting and baling corn stalks and other crop material comprising a hay baler having a fore-and-aft extending bale case, a feed chamber extending transversely from an intermediate location at one side of said bale case and opened forwardly, a rotatable crop pick-up in front of said feed chamber and operative to elevate and deliver crop material thereto, a chopper in front of said pick-up and alongside said bale case, said chopper including a transverse rotor having knives which sweep forwardly, upwardly, and then rearwardly to cut standing crop material and discharge it rearwardly over said pick-up and into said feed chamber, means supporting said chopper on said baler, said supporting means comprising relatively movable elements on said bale case and chopper respectively whereby the chopper may shift in vertical direction relative to said feed chamber, and ground engaging means on the chopper causing it to shift responsive to ground variations.

12. A harvester as recited in claim 11 wherein said supporting means comprises a hinge between the chopper and the baler bale case, said hinge having a removable fore-and-aft pin, and said chopper being tiltable relative to the baler about the hinge axis.

13. A harvester as recited in claim 12 wherein said ground engaging means comprises a caster wheel, and wherein a fore-and-aft stabilizer bar is detachably connected between the end of the chopper remote from the bale case and the portion of the baler rearwardly thereof.

References Cited

UNITED STATES PATENTS

| | | | |
|---|---|---|---|
| 2,756,554 | 7/1956 | Diehl et al. | 56—23 X |
| 2,817,945 | 12/1957 | McClellan | 56—24 X |
| 2,955,405 | 10/1960 | McDuffieq | 56—341 |
| 3,092,946 | 6/1963 | Mathews | 56—24 |
| 3,295,299 | 1/1967 | Brady et al. | 56—24 |

ANTONIO F. GUIDA, *Primary Examiner.*

ABRAHAM G. STONE, *Examiner.*

P. RAZZANO, *Assistant Examiner.*